July 20, 1971
U. P. TRUDEAU
3,594,146
MOLD CHARGE HANDLING APPARATUS
Filed Nov. 1, 1968
3 Sheets-Sheet 1
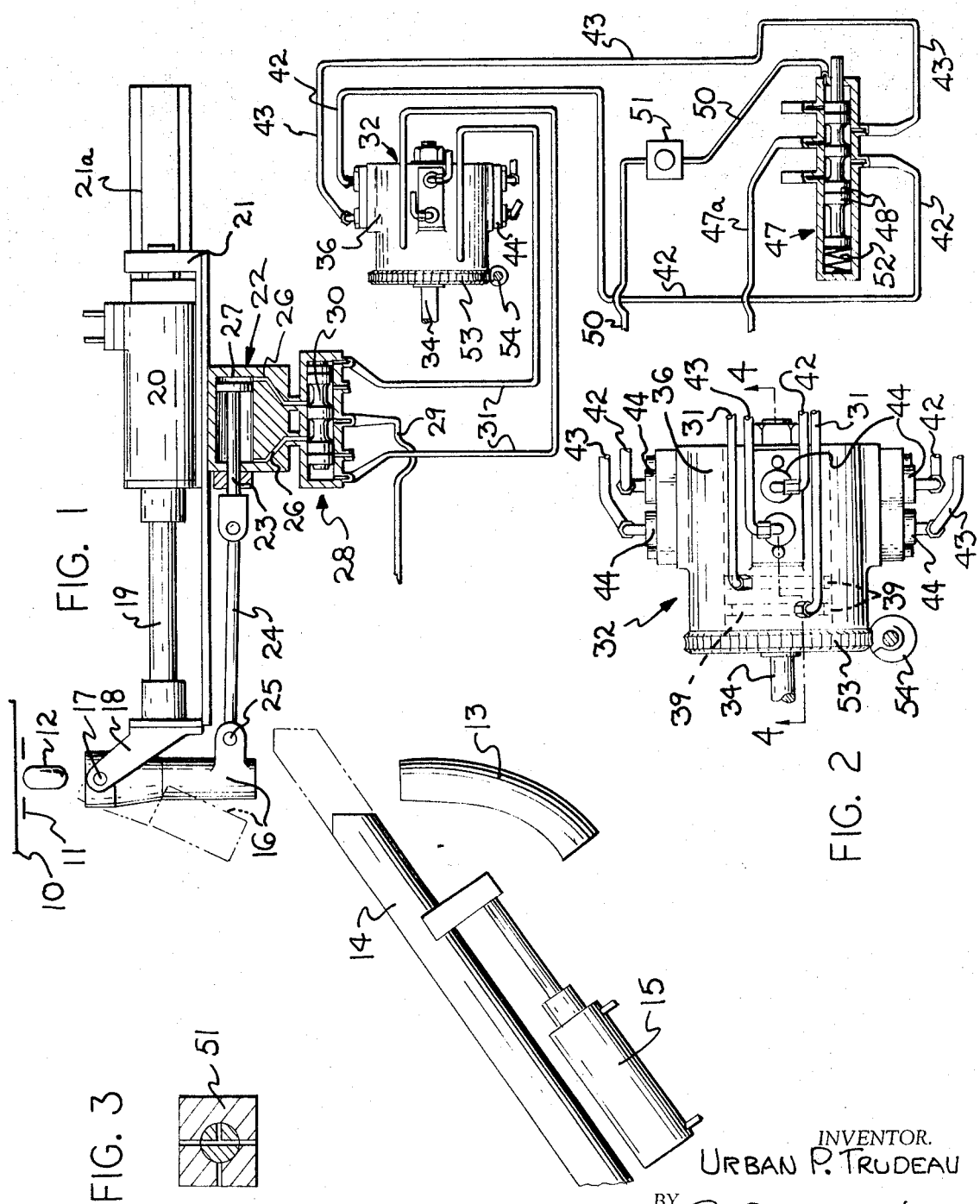
INVENTOR.
URBAN P. TRUDEAU
ATTORNEYS

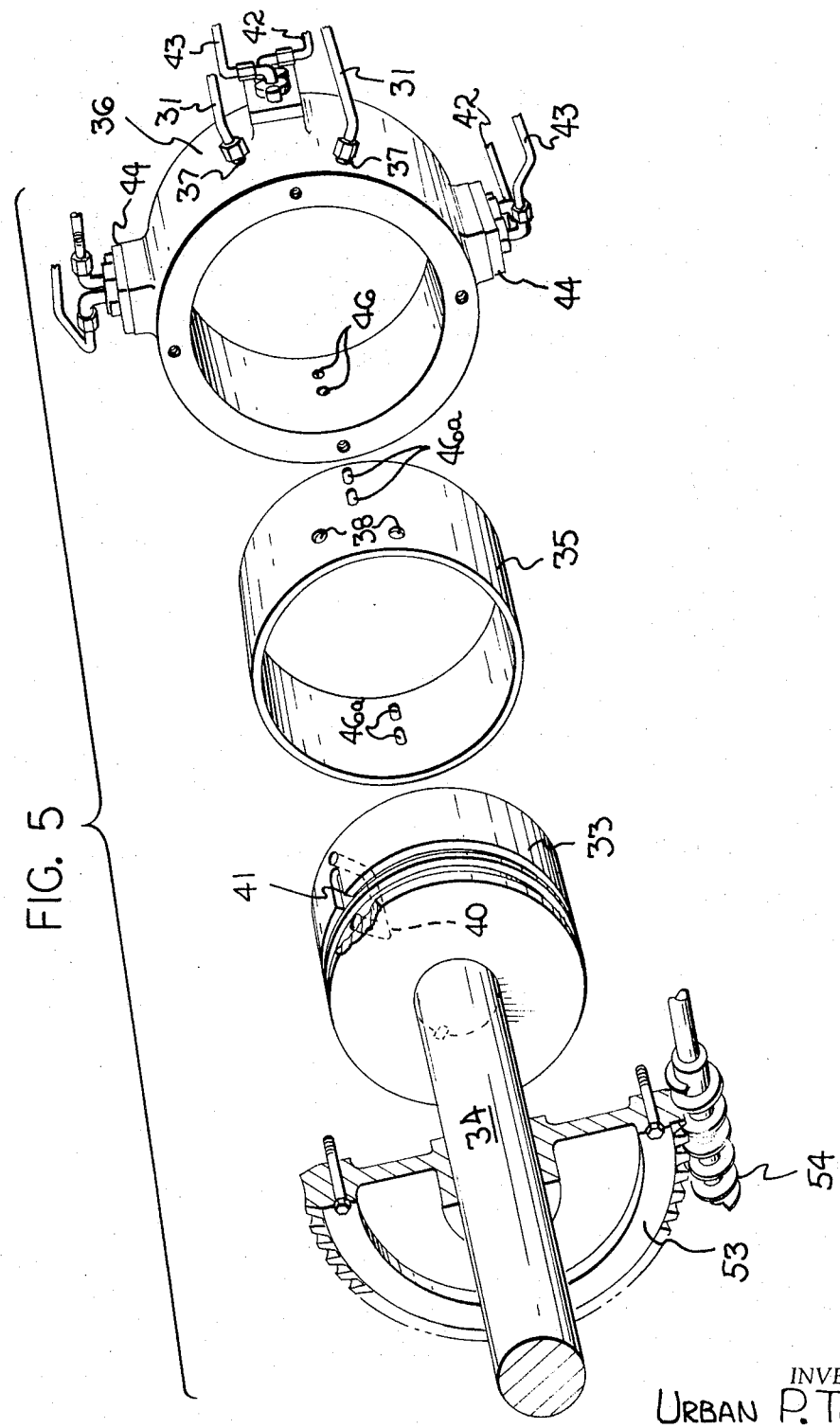

United States Patent Office 3,594,146
Patented July 20, 1971

3,594,146
MOLD CHARGE HANDLING APPARATUS
Urban P. Trudeau, Toledo, Ohio, assignor to
Owens-Illinois, Inc.
Filed Nov. 1, 1968, Ser. No. 772,709
Int. Cl. C03b 5/30
U.S. Cl. 65—165           7 Claims

ABSTRACT OF THE DISCLOSURE

Apparatus for handling feeder-formed glass mold charges or "gobs" in which segregrated gobs initially follow a downward vertical path on their way to the sections of an IS-type forming machine, there being a piston-motor operated gob deflector near or encircling said path and a timer and air-conduit arrangement including control-valves, one manually controlled, to regulably actuate the piston-motor for the purpose of positioning the deflector so as to prevent delivery of gobs to a selected section or sections, for any desired period of time.

RELATED APPLICATION

The present invention is designed for use in conjunction with a plural-section machine substantially as disclosed in my copending application Ser. No. 681,651, filed Nov. 9, 1967, titled "Apparatus for Handling Mold Charges of Molten Glass," but herein the machine comprises four individual sections rather than eight as in the copending case. My present invention, as is evident, affects movement of gobs only in the area between the feeder and the curved scoops shown in said copending application.

BACKGROUND OF THE INVENTION

The present invention pertains to apparatus for selectively diverting gobs of molten glass, or mold-charges, from a path of travel to a selected individual section of a forming machine of the IS-type, by means comprising a deflector which normally allows free fall of segregated gobs from a feeder along a common vertical path to inclined troughs individual to and leading directly to the several machine sections, such however, being movable by a piston-motor under the control of an operator to divert gobs, at will, to a "cullet" chute, or the like receiver, so that any given section or sections of the machine may be "cut out" of operation. The piston-motor, which moves the deflector and a timer for controlling the flow of air under pressure to the motor via a spool-valve are common to all of the machine sections, there being connected to the timer, or distributor, pairs of air-pressure supply conduits or pipes and manually operable control valves individual to the machine sections. The settings or positions of these valves determine the deflector position and consequently where the gobs will go.

DESCRIPTION OF THE PRIOR ART

In Ingle Pats. Nos. 1,843,159 and 1,843,160, there is shown the conventional IS-type machine with which my invention is especially intended for use. In these patents the "gob reject system" provides merely that the delivery trough, individual to the section of the machine to be "cut out" of operation, be held in a retracted position to prevent delivery of gobs to that section. It has also been proposed and attempts made to divert falling gobs by air-blasts. Neither of these procedures, in applicant's view, is particularly economical or mechanically good practice.

An important object of my invention therefore is the provision of a piston-motor actuated deflector positionable either in or out of the initial vertical path of downward travel of segregated mold-charges to forming machine sections and a system of valves, air lines and a timer, or distributor, through which an operator may manually selectively terminate gob-delivery to any section or sections, at will, and for any desired period of time.

Other objects will be in part apparent and in part pointed out hereinafter.

BRIEF DESCRIPTION OF THE DRAWINGS

FIG. 1 is a general side elevational view, partly in section of the invention, together with valves and a piping diagram;

FIG. 2 is a side elevational view of the timer or distributor;

FIG. 3 is a detail sectional view of the manually operated three-way valve, there being one such valve for each forming machine section;

FIG. 5 is an exploded isometric view of the timer or distributor elements.

Figure 4:
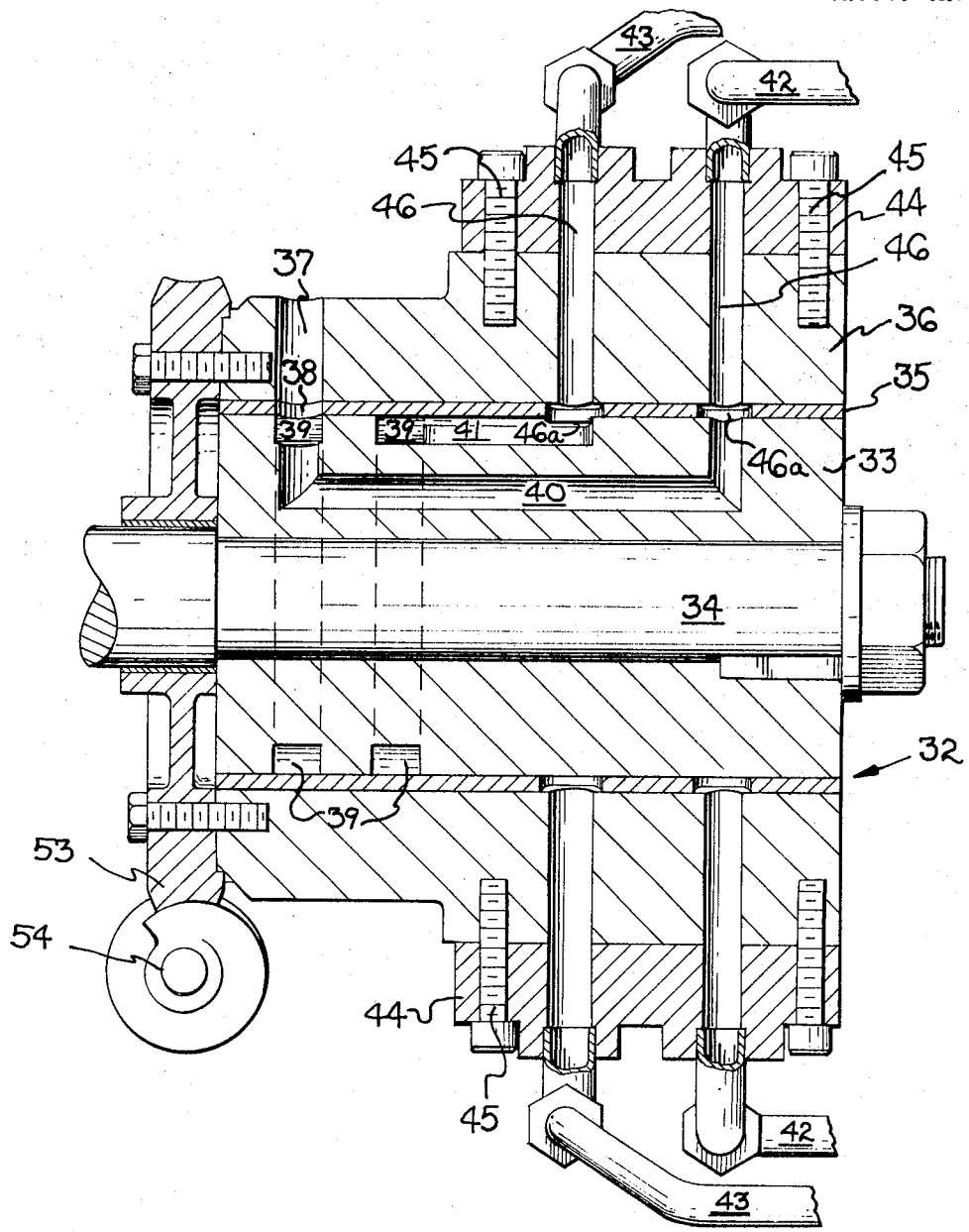
FIG. 4 is an enlarged detail sectional view taken substantially along the line 4—4 of FIG. 2, with parts in elevation.

In the illustrated embodiment of my invention, it is shown immediately beneath a conventional flow-feeder 10 and shears 11 which comprise standard commercial apparatus for producing segregated "gobs" 12, or mold charges, of molten glass which fall by gravity along a straight vertical path to the upper end of a scoop 13, the latter, as in my identified copending application, being capable of oscillation on a vertical axis to register its lower end successively with inclined troughs, one at a time, such troughs being individual to the forming machine sections, as in said application and the Ingle patents. Normally these gobs move as just stated, although under certain conditions all may be deposited in a cullet chute 14, or trough. When this is desired, the chute 14 will be projected into the vertical path of the gobs, perhaps by means of an air-operated piston-motor 15, or the like. At times, however, for one reason or another, it may be necessary, or desirable, to temporarily discontinue production on one of the machine sections.

To this end my invention provides an elongated deflector 16 which may be a funnel, tube, or possibly a trough-like device disposed longitudinally of and coaxial with the initial vertical path of downward travel of the gobs 12, or in the event it is a trough-like device it may be placed adjacent one side of said path. This deflector is pivoted at, or near, its upper end through a horizontal hinge pin 17 to a bracket 18 at the other end of the piston-rod 19 of a stationary horizontal piston-motor 20. An elongated bracket 21 fixed at its forward end to the bracket 18 and at its rearward end to the end of the piston rod 19, is guided in its reciprocating travel by a guide 21a. The bracket 21 has a piston motor 22 mounted therebeneath. Thus motor 20 serves to bodily shift both the deflector 16 and its actuating piston-motor 22 as a unit laterally relative to the downward path of travel of the gobs to the scoop 13. So long as all sections of the machine (not shown) are producing ware, the deflector 16 is in the full-line position shown, but if one section is "cut out" of production, the deflector 16 is moved to the dotted-line position at proper times in relation to gob delivery, to divert gobs intended for that section, to the cullet chute 14.

The last-mentioned piston-motor 22, which moves the deflector 16 between the full and dotted-line positions shown, has its piston rod 23 connected by a link 24 to a pin 25 at the lower end of the deflector. This piston-motor 22 has ports 26 leading from opposite ends of its cylinder 27 to a four-way spool-valve 28. Air under pressure is supplied continuously by a conduit 29 to the medial point of the valve 28. As is evident, the position of the spool 30 determines which end of the piston-motor cylinder 27 will receive air under pressure and that in turn determines the deflector 16 position. An air pressure supply pipe 31, or conduit, leads from each end of the spool-valve 30 to a timer 32, or distributor, which is common to all of the machine sections. This timer 32, or distributor, comprises a rotor 33 splined to a shaft 34 which is driven, or rotated, by and in synchronism with the feeder-drive mechanism (not shown) so that certain passageways, ports, etc. will be properly interconnected relative to the gob-delivery cycle, as is considered to be evident. A wear-resistant bearing sleeve 35 encircles the rotor between it and the housing 36, such sleeve being suitably secured to the latter and non-rotating. The aforementioned conduits 31 are connected through ports 37 in the housing 36 and ports 38 in the sleeve 35, to a pair of axially spaced-apart annular channels 39. One of these channels 39 is connected to a relatively long passageway 40 adjacent the shaft 34 (FIG. 4) while the other channel 39 communicates directly with a second passageway 41 which is located radially outward from and parallel to the first passageway 40. At those ends remote from the channels 39, the passageways 40 and 41 are connected to flexible pipes 42 and 43 respectively, the latter anchored in attaching blocks 44 which are secured to the housing by screws 45. There are four such blocks 44 to accommodate four pairs of the pipes 42 and 43 since the forming machine comprises four sections. Pairs of ports 46 in the blocks and housing, and registering slot-like ports 46a in the sleeve 35 establish communication between the longitudinal passageways 40 and 41 and the pipes 42 and 43 periodically. I have ascertained that the slot-like form of the ports 46a contributes to rapid air movement in this area. Each pair of the pipes 42 and 43 (FIG. 1) which are individual to the forming machine sections, lead to a spring-return four-way spool valve 47, there being one each of these valves 47 for each machine section. In this spring-return valve 47, the spool body 48 is moved in one direction by air under pressure delivered through a conduit 50 having therein a manually operable three-way valve 51 (FIGS. 1 and 3). With the three-way valve 51 admitting air to the right-hand end of the valve 47, air under pressure flows from a supply line 47a through said valve 47 and the pipe 43 to the timer, thence through passageway 41 in the rotor 33 to the corresponding channel 39 and finally through that pipe 31 which is connected to the left-hand end of the spool-type valve 28 in FIG. 1. Thus air enters the piston motor 22 to hold the deflector 16 in its full-line position. If, however, the deflector is to occupy the dotted-line, or gob-diverting position, the three-way valve 51 is turned to allow exhaust of air from pipe 43 and to permit the spring 52 to shift the spool body 48 to the right (FIG. 1). Thus air under pressure will then flow through pipe 42 (while being exhausted from pipe 43 to the atmosphere), passageway 40 in the rotor and the corresponding annular channel 39 to a pipe 31 and to the right-hand end of the spool-valve 28. Thereupon air operates the piston-motor 22 to move the deflector 16 to the dotted-line position shown so that certain gobs 12 then are diverted to the chute 14. So long as one of the three-way valves 51 is set to exhaust air from the spring-return valve 47, the piston-motor 22 will, due to rotation of the rotor by the feeder unit, operate at regular time intervals synchronized with the gob formation and delivery, as is evident. In order that the ports in the timer housing and rotor will or may be adjusted to register with each other, in proper time relation to the gob delivery, I attach a worm-gear 53 to an end of the housing 36 and use a meshing worm 54 to move the gear 53 and hence the housing 36 angularly relative to the rotor 33.

Modifications may be resorted to within the spirit and scope of the appeneded claims.

I claim:

1. In combination, apparatus for producing segregated mold-charges of molten glass which initially fall by gravity along a common vertical path and thence move along inclined paths in a predetermined order to a plurality of individual sections of a forming machine, a deflector adjacent said vertical path positionable to selectively divert mold-charges from the latter at times, an air-operated piston-motor for positioning the deflector in said path at times, means including a four-way spool-type valve connected to opposite ends of the piston-motor for selectively applying air under pressure to either end of the motor, a rotary timer having a pair of longitudinal air passageways common to said plurality of sections for controlling flow of air to said valve, means for establishing communication between one end of said passageways and opposite ends of the four-way valve, manually actuated means individual to each of said plurality of sections operating with and through said timer and valve for causing the motor to move the deflector, each said manually actuated means including valves connected through a pair of pipes to the other end of said passagways, and the last-named valves operable to connect only one of the corresponding pair of pipes at a time to a source of air under pressure.

2. In combination, apparatus for produicng segregated mold-charges of molten glass which initially fall by gravity along a common vertical path and thence move along inclined paths in a predetermined order to a plurality of individual sections of a forming machine, a deflector adjacent said vertical path positionable to selectively divert mold-charges from the latter at times, an air-operated piston-motor for positioning the deflector in said path at times, means including a valve through which air under pressure may be directed to either end of the motor, a rotary timer common to said plurality of individual sections for controlling flow of air to said valve, said rotary timer comprising a rotor rotating in synchronism with the mold-charge producing apparatus, there being a pair of longitudinal passageways in the rotor common to the plurality of individual sections, a pair of axially spaced-apart annular channels in said rotor, one channel communicating at all times with one of said pair of passageways and the other channel communicating with the other of said pair of passageways, conduits connecting the channels with said valve, a housing in which the rotor is rotatably mounted, manually actuated means individual to each of said sections, and a pair of air conduits interconnecting the passageways in the rotor with said manually actuated means, one at a time for causing the motor to move the deflector.

3. A combination as defined in claim 2 and means for bodily shifting the piston-motor and deflector laterally as a unit relative to said vertical path.

4. In combination, apparatus for producing segregated mold-charges of molten glass which initially fall by gravity along a common vertical path and thence move along inclined paths in a predetermined order to a plurality of individual sections of a forming machine, a deflector adjacent said vertical path positionable to selectively divert mold-charges from the latter at times, an air-operated piston-motor for positioning the deflector in said path at times, means including a valve through which air under pressure may be directed to either end of the motor, a rotary timer common to said plurality of individual sections for controlling flow of air to said valve, said rotary timer comprising a rotor having a pair of axially spaced-apart annular channels each continuously in communication with said valve, a pair of side-by-side longitudinal air passageways in said rotor, one passageway having an end connected to one of the channels, and the second passageway having an end connected to the other channel, there being a radial port at the other end of each passageway, a housing in which the rotor is mounted, said housing having pairs of radial ports corresponding in number to the individual sections and adapted for successive registration with said passageway ports incident to rotation of the rotor, a pair of supply pipes for air under pressure connected to each pair of the ports in said housing, manually actuated means individual to each section and said manually actuated means including valves for effecting flow of air under pressure through one of the pipes while opening the other pipe to the atmosphere for causing the motor to move the deflector.

5. In a combination as defined in claim 2, the housing having radial ports individual to the machine sections for periodic successive register with corresponding ported ends of the passageways in said rotor and means for manually shifting the housing about the rotor axis to synchronize initiation of register of the ports in the housing and said passageways, with formation and delivery of the mold-charges.

6. A combination as defined in claim 4, and manually operable means for shifting the housing about the rotor axis thereby to synchronize initiation of said registration of the ports with formation and delivery of the mold-charges.

7. In a combination as defined in claim 5, the last-named means being a worm-gear secured to an end of the housing and a manually operable worm meshing with said gear.

References Cited

UNITED STATES PATENTS 2,836,934  6/1958  McLaughlin et al. ____ 65—165

ARTHUR D KELLOGG, Primary Examiner

U.S. Cl. X.R.

65—164, 304